United States Patent Office.

WILLARD S. BOON, OF ST. LOUIS, MISSOURI, ASSIGNOR OF ONE-HALF TO MAITLAND BOON, OF WATERTOWN, NEW YORK.

METHOD OF TREATING HOMINY FOR PRESERVATION.

SPECIFICATION forming part of Letters Patent No. 242,589, dated June 7, 1881.

Application filed March 3, 1881. (No specimens.)

*To all whom it may concern:*

Be it known that I, WILLARD STEPHEN BOON, a citizen of the United States, residing at St. Louis, in the State of Missouri, have invented an Improvement in the Mode of Treating Hominy for the Preservation of the Same, of which the following specification is a full, clear, and exact description.

Hominy, as is well known, is Indian corn or maize (*Zea mays*) taken in its raw state, hulled, and broken or cracked. This is the article of commerce, and as produced will, after a short period of time, deteriorate, especially in the summer season. It is also, as produced, in condition to attract weevils and other small insects.

The old way of hulling corn by the use of lye has been well known from the earliest settlement of this country. The use of lye to remove the hulls was a matter of necessity, as mills for grinding corn were scarce, and it was absolutely the only way that corn could be hulled, as the hulls had first to be removed from the kernels before the corn could be cooked soft. By this primitive and compulsory manner of preparing corn for food a natural taste has been created for hominy flavored with lye.

The decorticating process as practiced heretofore was as follows: The common corn was boiled in a very strong alkaline solution until the outer hull was entirely eaten off by the lye. Then the corn was thoroughly washed in several waters, and then it was boiled again, and again thoroughly washed, the same operation being performed several times to get the strong lye out of the corn sufficiently to render it palatable. Then the corn was let boil until it became soft, the whole process requiring from fourteen to eighteen hours. When the process was completed the corn was in whole kernels. This hominy, therefore, as produced was in a cooked state. This treatment forms no part of my process, and I do not therefore claim such as my invention, as the hominy which I preserve has not had any heat at all applied to it before being taken in its raw state from the hominy-mill, and has not undergone any previous saturation whatever.

The object of my invention is to treat the raw product with a preservative, so that it will keep for any length of time in any climate, and not be liable to be sought after by insects, besides producing a better article of food with lye flavor, more digestible and palatable, and more easily and quickly cooked. To accomplish this I take the common decorticated cracked corn in its raw state as it comes from the hominy-mill, and saturate or wet it, either by sprinkling or immersion, with a weak solution of lye, leaving it in that condition for from four to six hours, and then place it in a drying-room to restore it to a dry condition. The room may have a perforated iron floor, a furnace underneath for heating, and a large ventilator above to carry off the steam. This simple process imparts the desired pure lye flavor to the hominy, and furnishes a superior article, so far as preserving and facility in cooking are concerned.

The article treated as above stated will retain its soundness, and will cook in about one-sixth of the time required to cook the old-fashioned lye hominy.

The alkaline solution may be made preferably in the proportion of one part of lye, strong enough to float an egg, to twenty parts of water, and may be used at any temperature which will not cook the corn so as to injure the product, for if the corn is cooked at all it is subject to deterioration.

In my treatment of the raw cracked hominy I prefer to use cold lye made from hickory-ashes and filtered, and to supply just sufficient lye to impart at once the desired flavor and preservative qualities to the hominy.

I would here state that the alkali is never in such quantity as to injure the digestive organs, but has a corrective effect in counteracting acidity of the stomach, and has been recommended by the medical profession as a wholesome article of diet.

In place of lye made from ashes, pure potash may be used for the solution and the hominy impregnated therewith.

I am aware that it is not new to add carbonate of soda to vegetables at the time of cooking the same by boiling, and this I do not claim.

Having thus described my invention, the following is what I claim as new therein and desire to secure by Letters Patent:

1. The herein-described product, preserved hominy, which consists of hulled raw alkalized dry kernels of corn, in contradistinction to cooked and decorticated corn produced by boiling or scalding the same in lye.

2. The process of preserving hominy, consisting of taking the hulled raw dry kernels of corn as they come from the mill and saturating or wetting them with a weak alkaline solution, and then drying without washing or partially cooking the same, as set forth.

WILLARD S. BOON.

Witnesses:
 THOMAS T. RAMEY,
 MAITLAND BOON.